United States Patent [19]
Sato

[11] Patent Number: 6,166,505
[45] Date of Patent: Dec. 26, 2000

[54] INTERLOCKING APPARATUS

[75] Inventor: Mitsuya Sato, Yokohama, Japan

[73] Assignee: Canon Kabushiki Kaisha, Tokyo, Japan

[21] Appl. No.: 09/323,021

[22] Filed: Jun. 1, 1999

[30] Foreign Application Priority Data

Jun. 1, 1998 [JP] Japan .................................. 10-165831

[51] Int. Cl.⁷ .............................. H01L 21/68; H02H 7/08; G02F 19/00
[52] U.S. Cl. ................. 318/568.1; 318/563; 318/568.12; 364/140
[58] Field of Search ..................................... 318/560–696, 318/800; 364/140, 131, 468, 141, 148, 143, 147; 395/821, 375, 800; 361/62, 66, 172

[56] References Cited

U.S. PATENT DOCUMENTS

| 4,233,642 | 11/1980 | Ellisberg .................................. 361/172 |
| 4,349,310 | 9/1982 | Schneider et al. ....................... 414/749 |
| 4,468,714 | 8/1984 | Russell ....................................... 361/62 |
| 4,477,753 | 10/1984 | Ratzel et al. ............................. 318/563 |
| 4,704,792 | 11/1987 | Itagaki et al. .............................. 29/741 |
| 5,148,363 | 9/1992 | Sakamoto et al. ....................... 364/143 |
| 5,339,014 | 8/1994 | Nesper ...................................... 318/563 |
| 5,479,622 | 12/1995 | Grohoski et al. ....................... 395/375 |
| 5,774,355 | 6/1998 | Mizuno et al. ........................... 364/140 |

Primary Examiner—Paul Ip
Attorney, Agent, or Firm—Fitzpatrick, Cella, Harper & Scinto

[57] ABSTRACT

An interlocking apparatus includes a plurality of determination units independent of each other, an operation stopping circuit, a switch, and a restoring circuit. The plurality of determination units determine that a semiconductor device manufacturing equipment has shifted to a predetermined state. The operation stopping circuit sets the manufacturing equipment to an operation stop state when at least one of the plurality of determination units determines that the manufacturing equipment has shifted to the predetermined state. The switch inputs a restoration instruction instructing that the manufacturing equipment set in the operation stop state is restored to an operation state. The restoring circuit is responsive to the restoration instruction to restore the manufacturing equipment to the operation state only when the manufacturing equipment is set in the operation stop state determined by all of the plurality of determination units determining that the manufacturing equipment has shifted to the predetermined state.

20 Claims, 3 Drawing Sheets

INTERLOCKING APPARATUS

BACKGROUND OF THE INVENTION

1. Field of the Invention

The present invention relates to an interlocking apparatus and, more particularly, to an interlocking apparatus having multiple elements to ensure reliability.

2. Description of the Related Art

Figure 3:
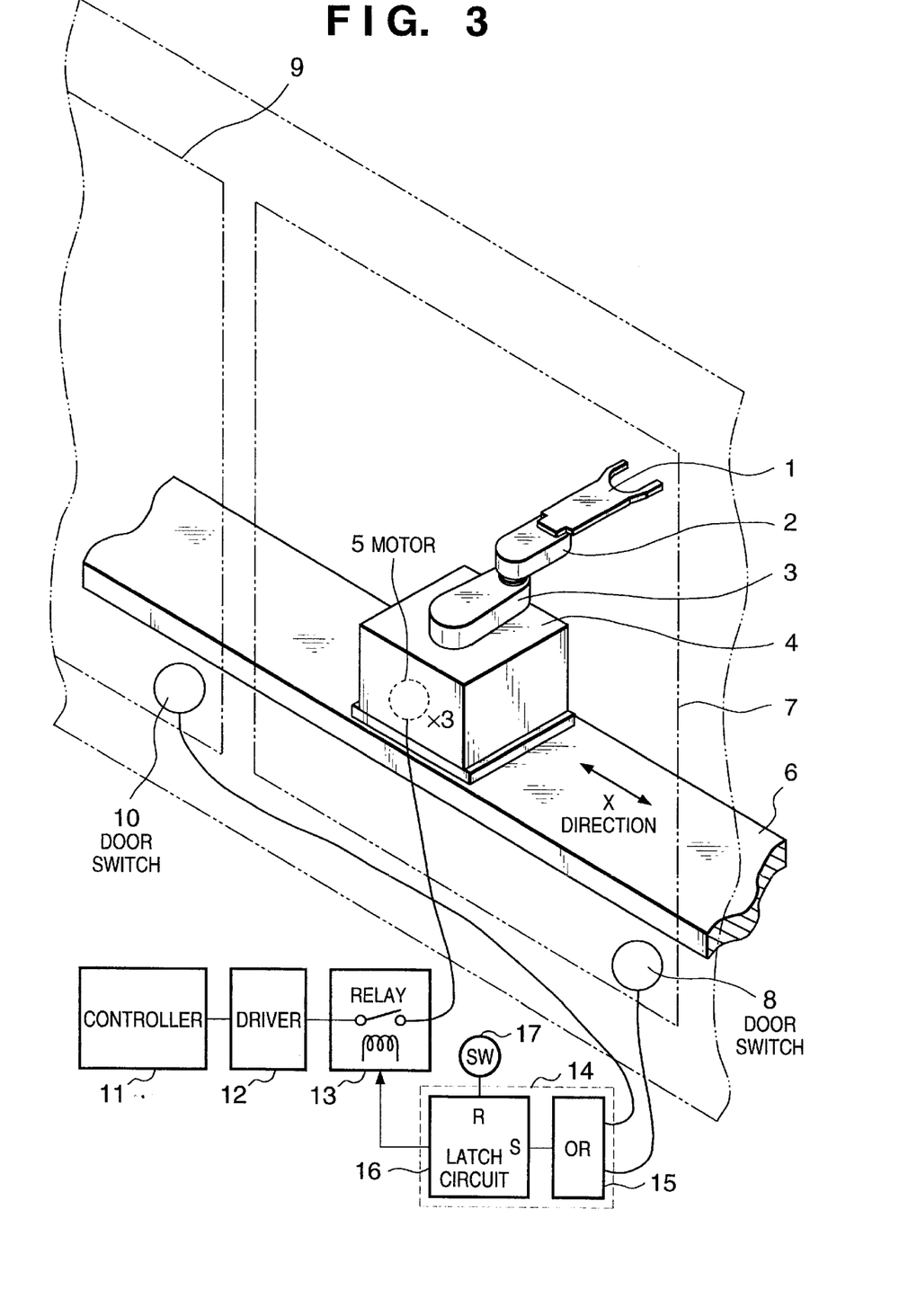
FIG. 3 is a view showing the arrangement of a conventional interlocking apparatus.

FIG. 3 is a view for explaining the function of a conventional interlocking apparatus. FIG. 3 shows a robot hand portion 1, robot arms 2 and 3, a robot mounting portion 4, three motors 5, a robot moving rail 6, system front covers 7 and 9, door switches 8 and 10, a controller 11 of the robot, a driver 12, a relay 13, and a conventional interlocking apparatus 14. The robot mounting portion 4 can move in the X direction. The motors 5 extend, contract, and rotate the robot arms 2 and 3 and drive the robot mounting portion 4 in the X direction. The door switches 8 and 10 respectively detect that the system front covers 7 and 9 are opened/closed. The driver 12 drives the motors 5 in the robot. The relay 13 connects or disconnects the driver 12 and motors 5 to or from each other. The interlocking apparatus 14 turns off the relay 13 under predetermined conditions. An OR circuit 15 receives outputs from the door switches 8 and 10. A latch circuit 16 (RS flip-flop) is set when an output from the OR circuit 15 becomes active. The OR circuit 15 and latch circuit 16 constitute the interlocking circuit 14. A release switch 17 resets the latch circuit 16.

In this configuration, when the system front cover 7 or 9 is opened, this state is detected by the door switch 8 or 10. The latch circuit 16 in the interlocking circuit 14 is set accordingly to turn off the relay 13. When the relay 13 is OFF, the drive operations of all the motors 5 in the robot are stopped to ensure safety.

In this prior art, the safety is ensured. However, while the system front cover 7 or 9 is open, even if the robot does not exist near the open system front cover 7 or 9, or even if the operator does not access the interior of the system, the whole system is stopped by the interlocking apparatus 14. Considering convenience for maintenance, this prior art is not optimum.

In various types of industrial systems of recent years, the interlocking function is performed on the basis of the determination of various conditions. For example, in the above case, not only the door switches are provided respectively to the front covers 7 and 9 of each system, but also robot detection sensors for detecting the presence/absence of the robot are provided near the front covers 7 and 9, respectively, of each system, and insertion detection sensors for detecting an insertion by means of an optical sheet beam are provided to the opening portions of the front covers 7 and 8, respectively, of each system. The drive operation of the robot is stopped only when the system front cover 7 or 9 is open, the robot exists near the opening portion of the system front cover 7 or 9, and some insertion exists in this opening portion.

In recent years, safety requirements that are stricter than before have been imposed on various types of industrial systems. In particular, regarding an interlocking apparatus, the following requirements have begun to arise. More specifically, $\hat{1}$ the interlocking apparatus must be formed by using highly reliable electromechanical components such as a relay and a switch; $\hat{2}$ when using semiconductor components such as ICs or transistors, they must be used in a duplex manner; and $\hat{3}$ no software must be used.

It is practically difficult to achieve the various types of detection functions and determinations on conditions described above with only electromechanical components in accordance with the above item $\hat{1}$. Inevitably, the semiconductor components are used in a duplex manner in accordance with the above item $\hat{2}$.

It is, therefore, significant to ensure the reliability of the duplex portion of the interlocking apparatus.

SUMMARY OF THE INVENTION

The present invention has been made in view of the above situation and, has as its object to maintain the reliability of an interlocking apparatus by effectively utilizing, e.g., advantages achieved by multiple constituent elements.

In order to achieve the above object, according to the first aspect of the present invention, there is provided an interlocking apparatus comprising a plurality of determination means independent of each other to determine that a control target has shifted to a predetermined state, operation stopping means for setting the control target to an operation stop state when at least one of the plurality of determination means determines that the control target has shifted to the predetermined state, input means for inputting a restoration instruction instructing that the control target set in the operation stop state by the operation stopping means is restored to an operation state, and restoring means responsive to the restoration instruction to restore the control target to the operation state only when the operation stopping means sets the control target in the operation stop state determined by all of the plurality of determination means determining that the control target has shifted to the predetermined state.

The interlocking apparatus according to the first aspect of the present invention preferably further comprises alarm means for generating an alarm when determination results of the plurality of determination means do not coincide with each other.

In the interlocking apparatus according to the first aspect, the operation stopping means preferably sets the control target in the operation stop state by stopping power supply to the control target.

The interlocking apparatus according to the first aspect of the present invention preferably further comprises a relay circuit for controlling power supply to the control target. The relay circuit is preferably controlled by the operation stopping means and the restoring means.

The interlocking apparatus according to the first aspect of the present invention preferably further comprises a plurality of storage means respectively corresponding to the plurality of determination means. When one determination means determines that the control target has shifted to the predetermined state, a corresponding one storage means preferably continuously stores a determination result, and the restoring means preferably refers to the plurality of storage means to determine whether the control target is to be restored to the operation state.

In the interlocking apparatus according to the first aspect of the present invention, the restoring means preferably includes means for resetting the storage means when the control target is to be restored to the operation state.

In the interlocking apparatus according to the first aspect of the present invention, the plurality of determination means are preferably constituted by a circuit including a semiconductor component, and the operation stopping means and the restoring means are preferably constituted by electromechanical components.

The interlocking apparatus according to the first aspect of the present invention preferably further comprises alarm means for generating an alarm when contents stored in the plurality of storage means are different from each other.

An interlocking apparatus according to the second aspect of the present invention comprises a plurality of determination means independent of each other to determine that a control target has shifted to a predetermined state, operation stopping means for setting the control target to an operation stop state when at least one of the plurality of determination means determines that the control target has shifted to the predetermined state, and alarm means for generating an alarm when determination results of the plurality of determination means are different from each other.

In the interlocking apparatus according to the second aspect of the present invention, the operation stopping means preferably sets the control target in the operation stop state by stopping power supply to the control target.

The interlocking apparatus according to the second aspect of the present invention preferably further comprises a relay circuit for controlling power supply to the control target. The relay circuit is preferably controlled by the operation stopping means.

In the interlocking apparatus according to the second aspect of the present invention, the plurality of determination means are preferably constituted by a circuit including a semiconductor component, and the operation stopping means is preferably constituted by an electromechanical component.

An equipment according to the third aspect of the present invention comprises either one of the interlocking apparatuses described above, and a system, e.g., a robot and semiconductor exposure apparatus controlled by the interlocking apparatus.

An interlocking method according to the fourth aspect of the present invention comprises the operation stopping step of setting a control target in an operation stop state when at least one of a plurality of determination units, independent of each other to determine that the control target has shifted to a predetermined state, determines that the control target has shift to the predetermined state, and the restoring step of restoring the control target to an operation state in response to a restoration instruction only when the control target is set in the operation stop state, in the operation stopping step, determined by all of the plurality of determination units determining that the control target has shifted to the predetermined state.

An interlocking method according to the fifth aspect of the present invention comprises the operation stopping step of setting a control target in an operation stop state when at least one of a plurality of determination units, independent of each other to determine that the control target has shifted to a predetermined state, determines that the control target has shift to the predetermined state, and the alarming step of generating an alarm when determination results of the plurality of determination units are different from each other Further objects, features and advantages of the present invention will become apparent from the following detailed description of the embodiment of the present invention with reference to the accompanying drawings.

DETAILED DESCRIPTION OF THE PREFERRED EMBODIMENT

Figure 2:
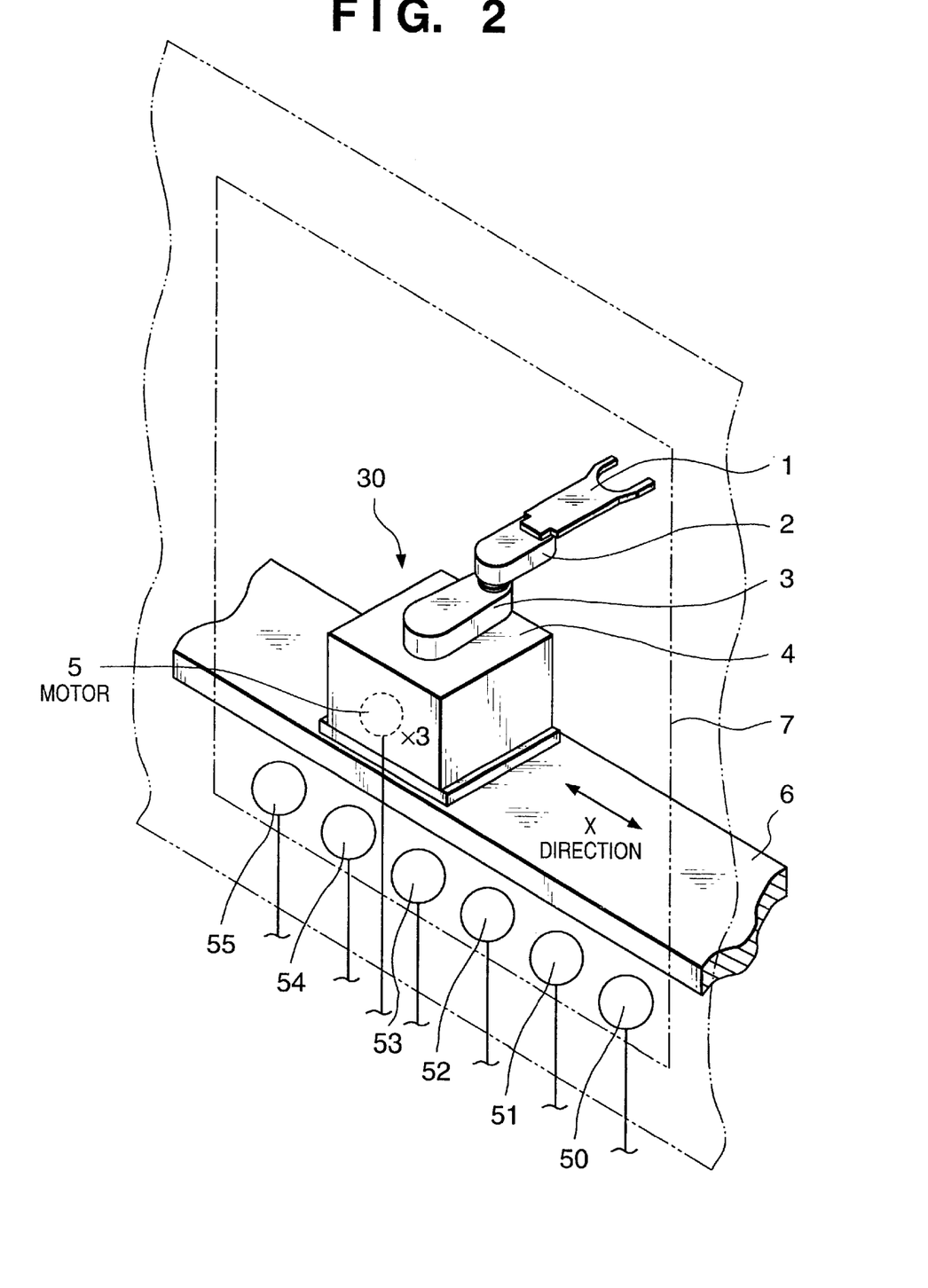
FIG. 2 is a view schematically showing part of an equipment to which the interlocking apparatus according to the preferred embodiment of the present invention is applied.

FIG. 2 schematically shows part of an equipment to which an interlocking apparatus according to a preferred embodiment of the present invention will be applied. As the equipment, for example, manufacture-related apparatuses such as an exposure apparatus, an etching apparatus, a CVD apparatus, a transfer apparatus, and the like used for manufacturing semiconductor devices and liquid crystal display devices are suitable. The equipment shown in FIG. 2 includes a transfer robot for transferring a substrate or the like to the semiconductor device manufacturing apparatuses such as the exposure apparatus.

Referring to FIG. 2, a transfer robot 30 includes a robot hand 1, robot arms 2 and 3, a robot mounting portion 4, and three motors 5. The robot hand 1 holds and moves a substrate or the like. The robot arm 3 is mounted on the robot mounting portion 4, and the robot mounting portion 4 moves the robot arm 3 in the X direction. The motors 5 extend, contract, and rotate the robot arms 2 and 3 and move the robot mounting portion 4 in the X direction. The robot mounting portion 4 is moved along a robot moving rail 6. A front cover (door) 7 is formed on the front surface of the equipment.

In the equipment shown in FIG. 2, first and second door switches 50 and 51, first and second robot detection sensors 52 and 53, and first and second insertion detection sensors 54 and 55 are attached. The first and second door switches 50) and 51 detect that the front cover 7 is opened or closed. The first and second robot detection sensors 52 and 53 detect whether the robot 30 exists near the front cover 7. The first and second insertion detection sensors 54 and 55 detect whether an insertion exists near the opening portion of a wall where the front cover 7 is formed.

Figure 1:
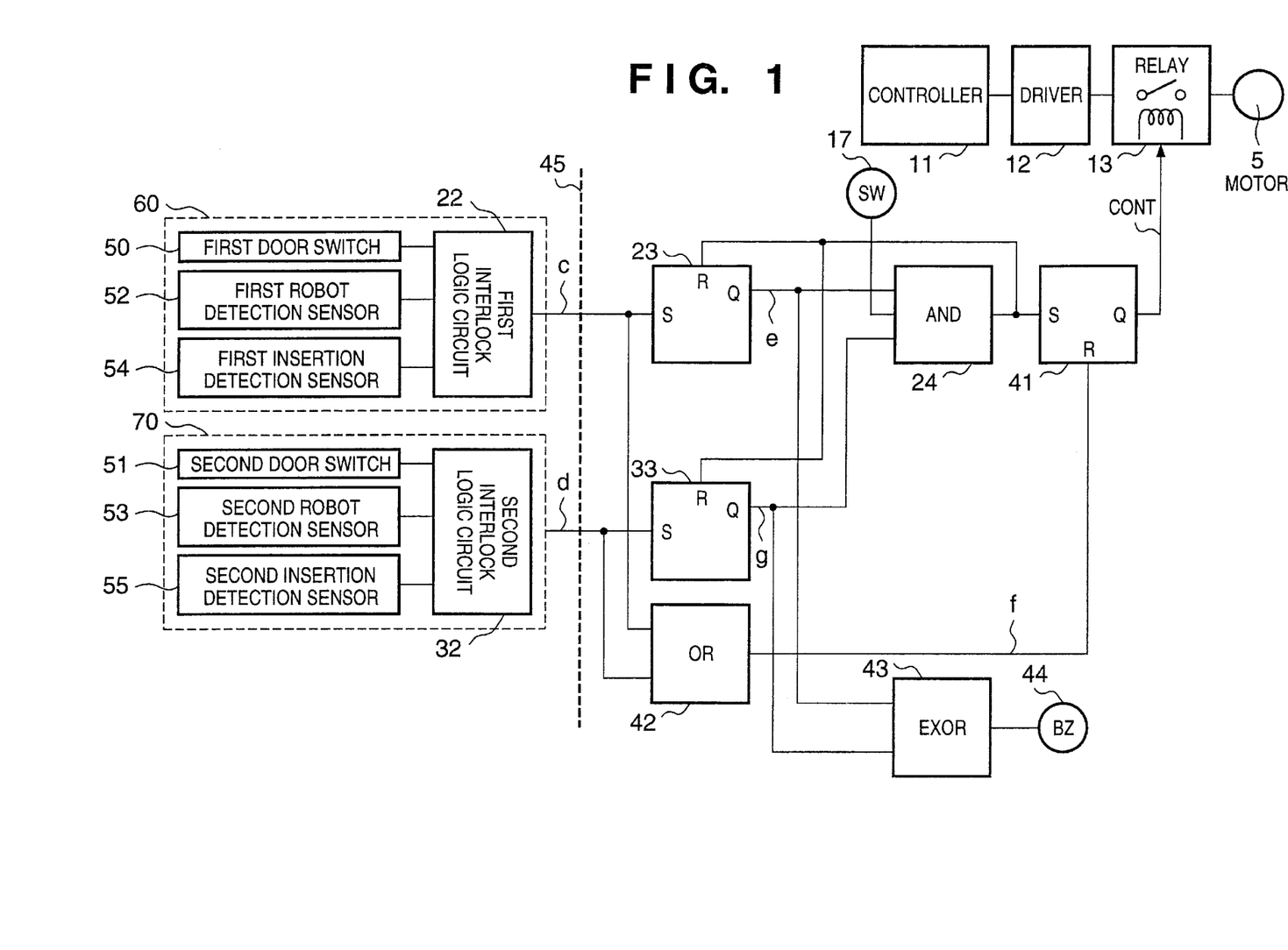
FIG. 1 is a block diagram showing the arrangement of an interlocking apparatus according to a preferred embodiment of the present invention.

FIG. 1 is a block diagram showing the arrangement of the interlocking apparatus suitably used by the equipment shown in FIG. 2. In FIGS. 1 and 2, constituent elements denoted by the same reference numerals are identical.

First and second interlock logic circuits 22 and 32 determine, independently of each other, whether the equipment shown in FIG. 2 should be interlocked. More specifically, the first interlock logic circuit 22 determines whether the equipment should be interlocked on the basis of three outputs from the first door switch 50, first robot detection sensor 52, and first insertion detection sensor 54. The second interlock logic circuit 32 determines, separately from the first interlock logic circuit 22, whether the equipment should be interlocked on the basis of three outputs from the second door switch 51, second robot detection sensor 53, and second insertion detection sensor 55.

When the first and second interlock logic circuits 22 and 32 determine that the equipment shown in FIG. 2 should be interlocked, they supply high-level first and second detection signals c and d indicating this to first and second latch circuits 23 and 33, respectively.

An output signal e from the first latch circuit 23 is set at high level by the high-level first detection signal c supplied from the first interlock logic circuit 22. An output signal g from the second latch circuit 33 is set at high level by the high-level second detection signal d supplied from the second interlock logic circuit 32.

An AND circuit 24 is a three-input AND circuit that receives the signals e and g output from the Q terminals of the two latch circuits 23 and 33, and a signal supplied from a switch 17. An output signal from the AND circuit 24 is supplied to the set terminal (S) of a latch circuit 41 and the reset terminals (R) of the latch circuits 23 and 33. When the two output signals e and g from the latch circuits 23 and 33 are both at high level and the signal supplied from the switch 17 is at high level, the output signal from the AND circuit 24 changes to high level. Accordingly, an output signal CONT from the latch circuit 41 is set at high level and the latch circuits 23 and 33 are reset.

The switch 17 is a switch for instructing cancellation of the interlocked state (CONT=low). The signal from the switch 17 changes to high level when cancellation of the interlocked state is instructed.

In the interlocking apparatus shown in FIG. 1, the latch circuits 23, 33, and 41 are so arranged as to set the output signals (Q) from the latch circuits 23 and 33 at low level and the control signal CONT as the output signal (Q) from the latch circuit 41 at high level immediately after the power switch is turned on.

An OR circuit 42 calculates the logical OR of the outputs c and d from the first and second interlock logic circuits 22 and 32 and supplies the operation result to the reset terminal (R) of the latch circuit 41. In other words, the control signal CONT as the output signal from the latch circuit 41 changes to low level when the output from at least one of the first and second interlock logic circuits 22 and 32 changes to high level. More specifically, the control signal CONT changes to low level when at least one of the first and second interlock logic circuits 22 and 32 determines that the equipment shown in FIG. 2 should be interlocked.

The output signal CONT from the latch circuit 41 is supplied to a relay 13. The relay 13 transmits power supplied from a driver 12 to the motors 5 when the control signal CONT is at high level, i.e., when the equipment shown in FIG. 2 need not be interlocked. The relay 13 does not transmit power supplied from the driver 12 to the motors 5 when the control signal CONT is at low level, i.e., when the equipment shown in FIG. 2 should be interlocked (interlocked state).

In this embodiment, the target to be controlled by the relay 13 is only the motors 5. However, the relay 13 may control units other than the motors 5, or may control the whole equipment.

An exclusive OR circuit 43 detects that the values of the output signals from the latch circuits 23 and 33 do not coincide, i.e., the determination results of the first and second interlock logic circuits 22 and 32 are different, and drives a buzzer 44. As a result, an alarm is generated.

According to this interlocking apparatus, when at least one of the multiple interlock logic circuits 22 and 32 determines that the equipment shown in FIG. 2 should be interlocked, the control signal CONT changes to low level to stop power supply to the motors 5, so that the equipment is shifted to the interlocked state. Hence, according to this interlocking apparatus, the interlocking function is not impaired even when a failure occurs in either one of a first determination unit 60, constituted by the first interlock logic circuit 22, first door switch 50, first robot detection sensor 52, and first insertion detection sensor 54 to determine if the interlocking conditions are satisfied, and a second determination unit 70, constituted by the second interlock logic circuit 32, second door switch 51, second robot detection sensor 53, and second insertion detection sensor 55 to determine if the interlocking conditions are satisfied.

In the interlocking apparatus shown in FIG. 1, a portion on the left side of a broken line 45 is constituted by components including semiconductor components, and a portion on the right side of the broken line 45 is constituted by electromechanical components. As the portion on the left side of the broken line 45 includes the semiconductor components, it is duplexed (multiple) to ensure high reliability.

The operation of the equipment shown in FIGS. 1 and 2 will be described. When the front cover 7 is opened, the output signals from the first and second door switches 50 and 51 respectively change to high level, and are supplied to the first and second interlock logic circuits 22 and 32, respectively.

In this state, if the transfer robot 30 is located near the opening portion of a wall where the front cover 7 is attached (i.e., the opening portion formed when the front cover 7 is open), the output signals from the first and second robot detection sensors 52 and 53 respectively change to high level and are supplied to the first and second interlock logic circuits 22 and 32, respectively. If an insertion exists in the opening portion of the wall where the front cover 7 is attached, the output signals from the first and second insertion detection sensors 54 and 55 change to high level, and are supplied to the first and second interlock logic circuits 22 and 32, respectively.

The first interlock logic circuit 22 sets its output signal c at high level when the three output signals from the first door switch 50, first robot detection sensor 52, and first insertion detection sensor 54 all change to high level, i.e., when the interlocking conditions are satisfied. Similarly, the second interlock logic circuit 32 sets its output signal d at high level when the three output signals from the second door switch 51, second robot detection sensor 53, and second insertion detection sensor 55 all change to high level, i.e., when the interlocking conditions are satisfied.

When at least one of the output signal c from the first interlock logic circuit 22 and the output signal d from the second interlock logic circuit 32 changes to high level, i.e., when at least one of the first and second interlock logic circuits 22 and 32 determines that the equipment should be interlocked, the output signal f from the OR circuit 42 is set at high level. Then, the latch circuit 41 is reset and the control signal CONT as the output signal from the latch circuit 41 changes to low level. The relay 13 is turned off to stop power supply from the driver 12 to the motors 5, so that the equipment is interlocked.

According to this interlocking apparatus, even when a failure has occurred in either the first or second determination unit 60 or 70, i.e., even when a state wherein the equipment shown in FIG. 2 should be interlocked cannot be detected, the equipment can be interlocked appropriately. However, if operation of the equipment is to be continued while a failure has occurred in either the first or second determination unit 60 or 70, the high reliability as the advantage of the multiple determination units cannot be effected. In other words, while a failure has occurred in one determination unit, if a failure occurs the other determination unit, the interlocking function is completely impaired. Then, an effect of the multiple determination units cannot be obtained.

In this interlocking apparatus, when the determination results of the first and second determination units 60 and 70 do not coincide, it is regarded that a failure has occurred in either the first or second determination unit 60 or 70, and cancellation of the interlocked state is prohibited. In other words, with this interlocking apparatus, even when a high-level signal (cancellation request signal) instructing cancellation of the interlocked state is received from the switch 17, if the determination results of the first and second determination units 60 and 70 do not coincide, the interlocked state is not canceled.

More specifically, this interlocking apparatus has the latch circuits 23 and 33 for respectively latching the output signals c and d from the first and second determination units 60 and 70, and the AND circuit 24 for receiving the output signals e and g from the latch circuits 23 and 33 and the signal supplied from the switch 17.

In this interlocking apparatus, when the output signals e and g from the latch circuits 23 and 33 are both at high level, as the output signal from the switch 17 shifts to high level, the output signal from the AND circuit 24 also shits to high level, to set the control signal CONT as the output signal from the latch circuit 41 (cancellation of the interlocked state), and to reset the latch circuits 23 and 33. This turns on the relay 13 to supply power from the driver 12 to the motors 5.

In this interlocking apparatus, when either the output signal e or g from the latch circuit 23 or 33 is at low level, the output signal from the AND circuit 24 maintains low level despite the shift of the output signal from the switch 17 to high level. Accordingly, the control signal CONT as the output signal from the latch circuit 41 is not set (to set means to cancel the interlocked state), and the latch circuits 23 and 33 are not reset.

In this interlocking apparatus, the exclusive OR circuit 43 checks if the output signal e from the latch circuit 23 and the output signal g from the latch circuit 33 coincide. If they do not coincide, it is regarded that a failure has occurred in either the determination unit 60 or 70. The exclusive OR circuit 43 then drives the buzzer 44 to output an alarm. In other words, in the interlocked state, if the buzzer 44 does not operate, both the first and second interlock logic circuits 22 and 32 can be determined to be normal.

The present invention is not limited to the above specific embodiment, but can be changed and modified in various manners. For example, in the above embodiment, the right side of the broken line 45 is constituted by the electromechanical components. However, the entire or part of the right side of the broken line 45 may be constituted by a semiconductor component, and this portion may be formed in a multiple manner.

In the above embodiment, two door switches are provided for the purpose of multiple components. If the door switch is to be formed of highly reliable components such as electromechanical components, only one door switch may be formed, and an output signal from this door switch may be distributed to two systems by electromechanical components and be supplied to the first and second interlock logic circuits.

According to the preferred embodiment of the present invention, the reliability of the interlocking apparatus can be maintained by effectively utilizing advantages obtained by the multiple constituent elements (e.g., determination units). More specifically, according to the preferred embodiment of the present invention, even if a failure occurs in part of a plurality of multiplexed constituent components, the advantage obtained by the multiple components is not lost, and the reliability of the interlocking apparatus can be maintained.

The present invention is not limited to the above embodiment and various changes and modifications can be made within the spirit and scope of the present invention. Therefore, to apprise the public of the scope of the present invention the following claims are made.

What is claimed is:

1. An interlocking apparatus comprising:
    a plurality of determination means independent of each other to determine that a control target has shifted to a predetermined state;
    operation stopping means for setting the control target to an operation stop state when at least one of said plurality of determination means determines that the control target has shifted to the predetermined state;
    input means for inputting a restoration instruction instructing that the control target set in the operation stop state by said operation stopping means is restored to an operation state; and
    restoring means responsive to the restoration instruction to restore the control target to the operation state only when the operation stopping means sets the control target in the operation stop state determined by all of said plurality of determination means determining that the control target has shifted to the predetermined state.

2. The apparatus according to claim 1, further comprising alarm means for generating an alarm when determination results of said plurality of determination means do not coincide with each other.

3. The apparatus according to claim 1, wherein said operation stopping means sets the control target in the operation stop state by stopping power supply to the control target.

4. The apparatus according to claim 1, further comprising a relay circuit for controlling power supply to the control target, said relay circuit being controlled by said operation stopping means and said restoring means.

5. The apparatus according to claim 1, wherein said apparatus further comprises a plurality of storage means respectively corresponding to said plurality of determination means,
    when one of said determination means determines that the control target has shifted to the predetermined state, a corresponding one of said storage means continuously stores a determination result, and
    said restoring means refers to said plurality of storage means to determine whether the control target is to be restored to the operation state.

6. The apparatus according to claim 5, wherein said restoring means includes means for resetting said storage means when the control target is to be restored to the operation state.

7. The apparatus according to claim 1, wherein said plurality of determination means are constituted by a circuit including a semiconductor component, and said operation stopping means and said restoring means are constituted by electromechanical components.

8. The apparatus according to claim 5, further comprising alarm means for generating an alarm when contents stored in said plurality of storage means are different from each other.

9. An interlocking apparatus comprising:
    a plurality of determination means independent of each other to determine that a control target has shifted to a predetermined state;
    operation stopping means for setting the control target to an operation stop state when at least one of said plurality of determination means determines that the control target has shifted to the predetermined state; and alarm means for generating an alarm when determination results of said plurality of determination means are different from each other.

10. The apparatus according to claim 9, wherein said operation stopping means sets the control target in the operation stop state by stopping power supply to the control target.

11. The apparatus according to claim 9, further comprising a relay circuit for controlling power supply to the control target, said relay circuit being controlled by said operation stopping means.

12. The apparatus according to claim 9, wherein said plurality of determination means are constituted by a circuit including a semiconductor component, and said operation stopping means is constituted by an electromechanical component.

13. An equipment having an interlocking apparatus and a system controlled by said interlocking apparatus, said interlocking apparatus comprising:

a plurality of determination means independent of each other to determine that said system has shifted to a predetermined state:

operation stopping means for setting said system to an operation stop state when at least one of said plurality of determination means determines that said system has shifted to the predetermined state;

input means for inputting a restoration instruction instructing that said system set in the operation stop state by said operation stopping means is restored to an operation state; and restoring means responsive to the restoration instruction to restore said system to the operation state only when the operation stopping means sets said system in the operation stop state determined by all of said plurality of determination means determining that said system has shifted to the predetermined state.

14. An equipment having an interlocking apparatus and a robot controlled by said interlocking apparatus, said interlocking apparatus comprising:

a plurality of determination means independent of each other to determine that said robot has shifted to a predetermined state;

operation stopping means for setting said robot to an operation stop state when at least one of said plurality of determination means determines that said robot has shifted to the predetermined state;

input means for inputting a restoration instruction instructing that said robot set in the operation stop state by said operation stopping means is restored to an operation state; and restoring means responsive to the restoration instruction to restore said robot to the operation state only when the operation stopping means sets said robot in the operation stop state determined by all of said plurality of determination means determining that said robot has shifted to the predetermined state.

15. An equipment having an interlocking apparatus and a semiconductor exposure apparatus controlled by said interlocking apparatus, said interlocking apparatus comprising:

a plurality of determination means independent of each other to determine that said semiconductor exposure apparatus has shifted to a predetermined state;

operation stopping means for setting said semiconductor exposure apparatus to an operation stop state when at least one of said plurality of determination means determines that said semiconductor exposure apparatus has shifted to the predetermined state;

input means for inputting a restoration instruction instructing that said semiconductor exposure apparatus set in the operation stop state by said operation stopping means is restored to an operation state; and restoring means responsive to the restoration instruction to restore said semiconductor exposure apparatus to the operation state only when the operation stopping means sets said semiconductor exposure apparatus in the operation stop state determined by all of said plurality of determination means determining that said semiconductor exposure apparatus has shifted to the predetermined state.

16. An equipment having an interlocking apparatus and a system controlled by said interlocking apparatus, said interlocking apparatus comprising:

a plurality of determination means independent of each other to determine that said system has shifted to a predetermined state;

operation stopping means for setting said system to an operation stop state when at least one of said plurality of determination means determines that said system has shifted to the predetermined state; and alarm means for generating an alarm when determination results of said plurality of determination means are different from each other.

17. An equipment having an interlocking apparatus and a robot controlled by said interlocking apparatus, said interlocking apparatus comprising:

a plurality of determination means independent of each other to determine that said robot has shifted to a predetermined state;

operation stopping means for setting said robot to an operation stop state when at least one of said plurality of determination means determines that said robot has shifted to the predetermined state; and alarm means for generating an alarm when determination results of said plurality of determination means are different from each other.

18. An equipment having an interlocking apparatus and a semiconductor exposure apparatus controlled by said interlocking apparatus, said interlocking apparatus comprising:

a plurality of determination means independent of each other to determine that said semiconductor exposure apparatus has shifted to a predetermined state;

operation stopping means for setting said semiconductor exposure apparatus to an operation stop state when at least one of said plurality of determination means determines that said semiconductor exposure apparatus has shifted to the predetermined state; and alarm means for generating an alarm when determination results of said Plurality of determination means are different from each other.

19. An interlocking method comprising:

an operation stopping step of setting a control target in an operation stop state when at least one of a plurality of determination units, independent of each other to determine that the control target has shifted to a predetermined state, determines that the control target has shifted to the predetermined state; and a restoring step of restoring the control target to an operation state in response to a restoration instruction only when the control target is set in the operation stop state, in the operation stopping step, determined by all of the plurality of determination units determining that the control target has shifted to the predetermined state.

20. An interlocking method comprising:

an operation stopping step setting a control target in an operation stopping state when at least one of a plurality of determination units, independent of each other to determine that the control target has shifted to a predetermined state, determines that the control target has shifted to the predetermined state; and an alarming step of generating an alarm when determination results of a plurality of determination units are different from each other.

* * * * *

UNITED STATES PATENT AND TRADEMARK OFFICE
CERTIFICATE OF CORRECTION

PATENT NO. : 6,166,505
DATED : December 26, 2000
INVENTOR(S) : Mitsuya Sato

Page 1 of 1

It is certified that error appears in the above-identified patent and that said Letters Patent is hereby corrected as shown below:

Title page,
Item [56] RC: U.S. Patent Documents, "Ellisberg" should read -- Ellsberg --.

Column 1,
Line 63, "$\hat{1}$" should read --①--.

Line 65, "$\hat{2}$" shoud read --②--.

Line 67, "$\hat{3}$" should read --③--.

Column 2,
Line 4, "$\hat{1}.$" shoud read --①.--.

Line 6, "2." shoud read --②.--.

Column 3,
Line 57, "other should read -- other. --.

Column 4,
Line 36, "50)" should read -- 50 --.x

Column 10,
Line 56, "Plurality" should read -- plurality --.

Signed and Sealed this

Sixteenth Day of October, 2001

Attest:

NICHOLAS P. GODICI
*Attesting Officer*     *Acting Director of the United States Patent and Trademark Office*